Nov. 14, 1950 R. M. RUSH 2,529,574
DIRECT FIRED HOT-AIR HEATING APPARATUS
Filed Sept. 4, 1945 4 Sheets-Sheet 1

INVENTOR
Ralph M. Rush
By Christy, Parmelee & Strickland
his attorneys

Nov. 14, 1950    R. M. RUSH    2,529,574
DIRECT FIRED HOT-AIR HEATING APPARATUS
Filed Sept. 4, 1945    4 Sheets-Sheet 2
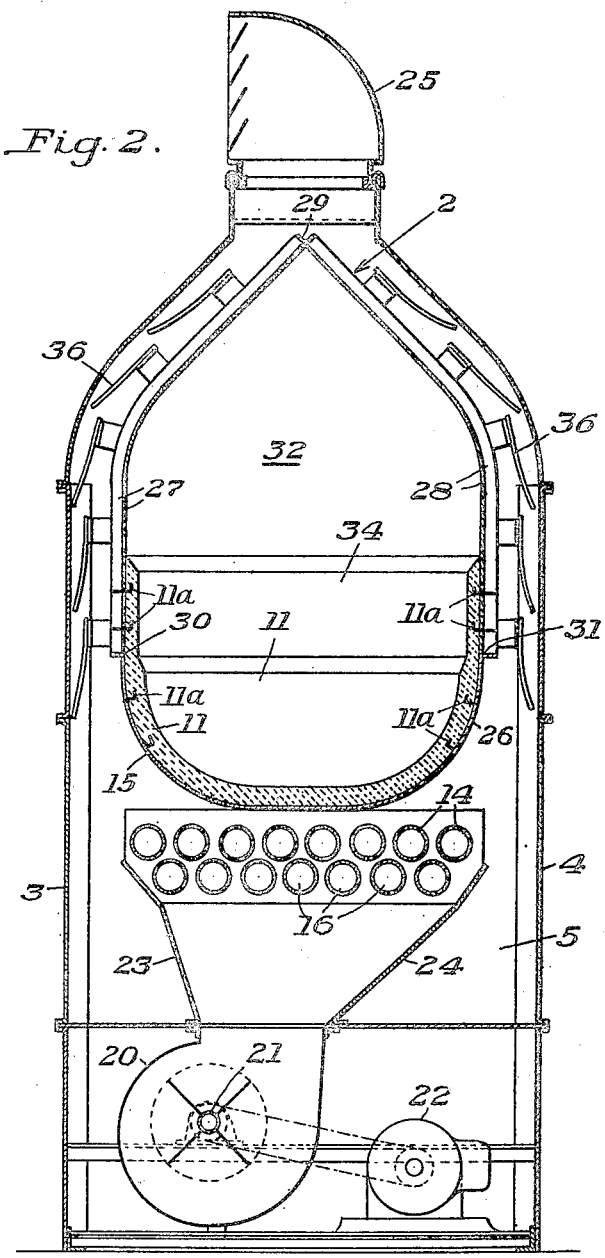
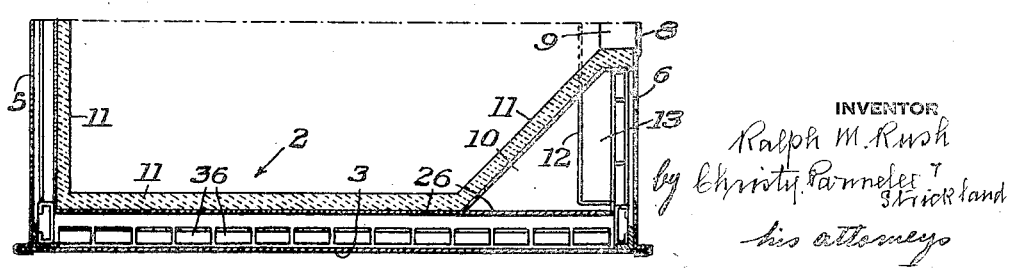
INVENTOR
Ralph M. Rush
by Christy, Parmelee & Strickland
his attorneys

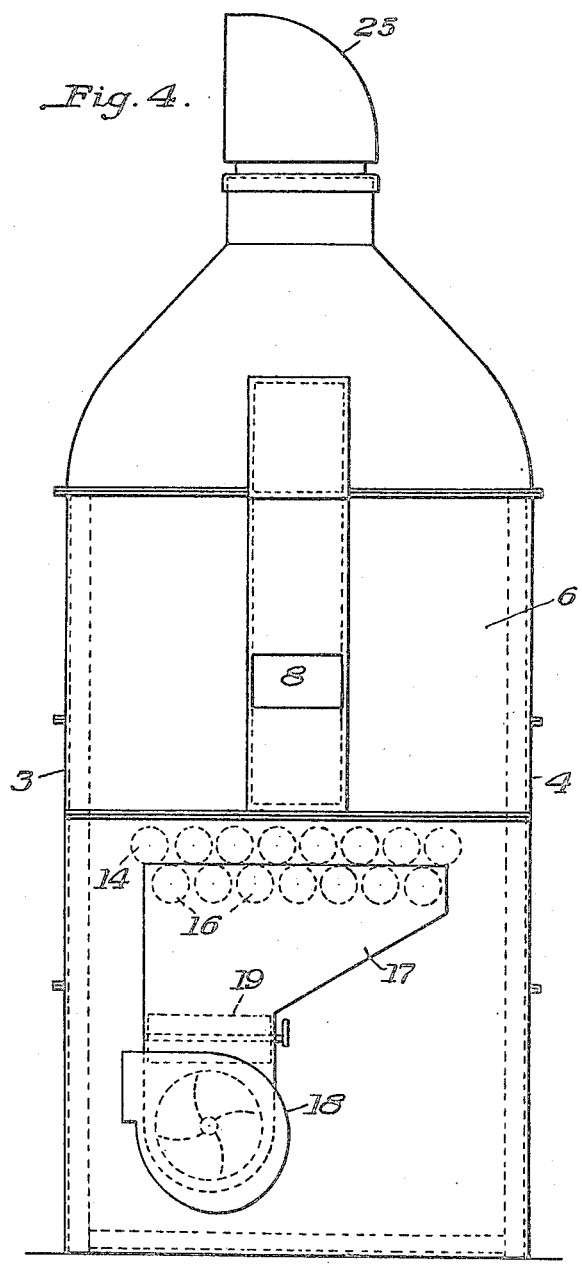

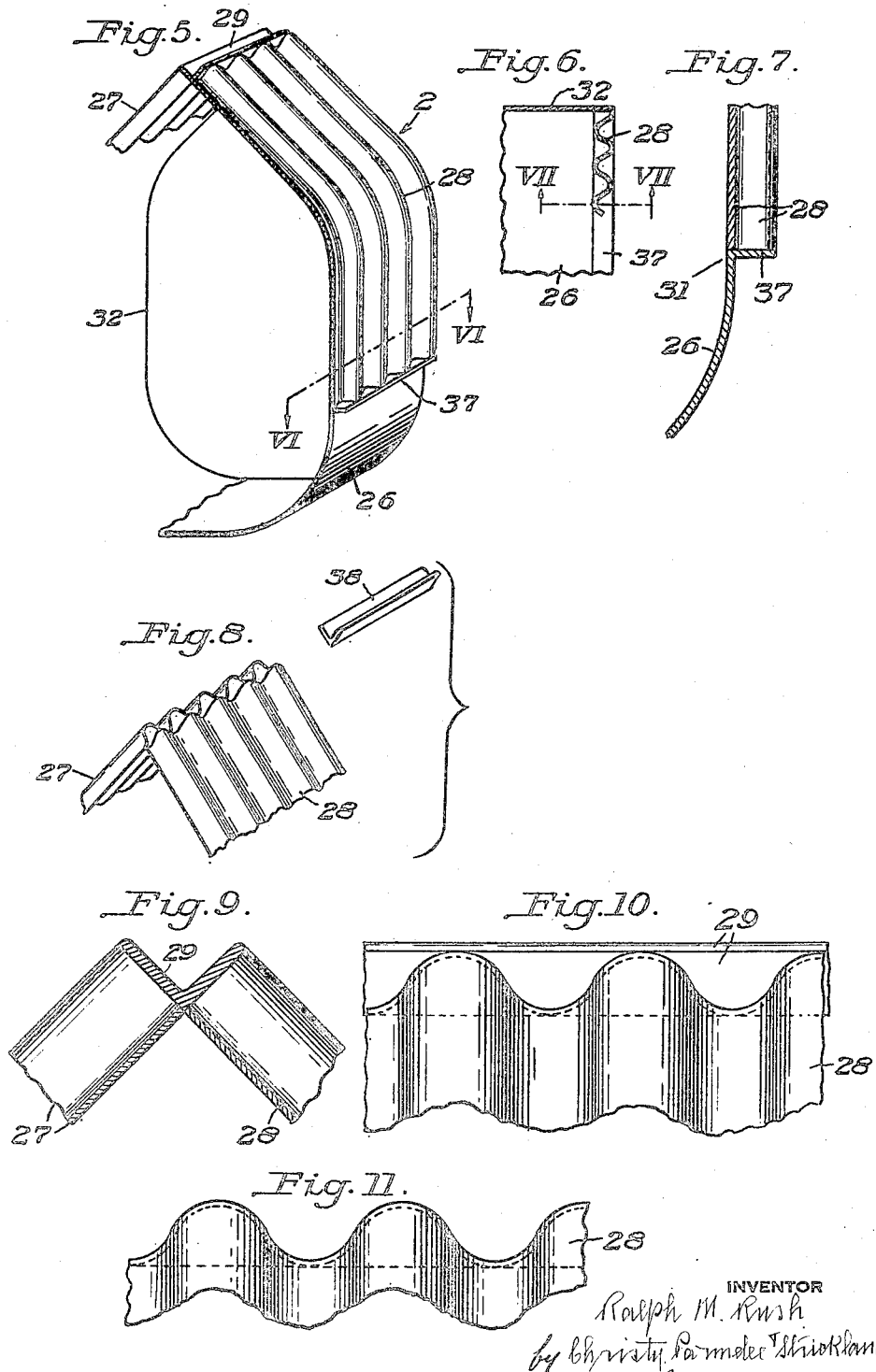

Patented Nov. 14, 1950

2,529,574

UNITED STATES PATENT OFFICE 2,529,574

DIRECT FIRED HOT-AIR HEATING APPARATUS

Ralph M. Rush, Pittsburgh, Pa., assignor to Dravo Corporation, Pittsburgh, Pa., a corporation of Pennsylvania Application September 4, 1945, Serial No. 614,312

5 Claims. (Cl. 126—110)

The invention relates to heaters designed and intended primarily for use in industrial plants, and consists in certain new and useful improvements in the construction of such heaters.

In United States Letters Patent No. 2,376,140, granted May 15, 1945, and owned in common with the invention hereof, a heater of the general type in which the improvements of my invention find utility is illustrated and described.

The heater of said Letters Patent comprises a combustion chamber arranged within and spaced from the walls of outer housing or casing. Fuel is burned in the combustion chamber, and the products of combustion flow from the chamber through the passages of a bank of heat-exchange tubes to an exhaust. The heat-exchange tubes, communicating at one end with the interior of the combustion chamber and at opposite end with the exhaust, may be arranged in the space between the walls of the combustion chamber and the outer casing, and one or more fans are arranged to impel air through the spaces between the walls of the combustion chamber and outer casing to discharge outlets. The streams of air, flowing over the hot external surfaces of said heat-exchange tubes and combustion chamber, are heated to desired degree and emerge through said outlets to heat the room within the factory, or shop, or other room or space to be heated.

In the further development of the patented heater certain valuable improvements were made in the mechanical structure of the combustion chamber, and, additionally, certain advantages were discovered in a new and particularly effective arrangement of a plurality of banks or passes of heat-exchange tubes and headers externally of the combustion chamber, but within the outer casing of the heater, in conjunction with a flue-box and exhaust fan in compact unit assembly upon the outer wall of the casing. The improvements in the novel structural features of the combustion chamber form the subject-matter of a now abandoned patent application, Serial No. 581,062, filed by me on March 5, 1945 of which this, my present application, is a continuation-in-part.

The invention will be understood upon reference to the accompanying drawings, in which a heater including an exemplary and presently preferred embodiment of the invention is illustrated:

Figure 2 is a view of the heater in cross section, as seen on the plane II—II of Figure 1;

Figure 3 is a fragmentary view, showing the structure to smaller scale, and in horizontal section, on the plane III—III of Figure 1, and with a certain burner shown in Figure 1 omitted from Figure 3;

Figure 4 is a view of the heater structure in end elevation, as seen from the right of Figure 1, but with the said burner omitted, and the firing port in which the burner is mounted appearing in elevation.

Figure 5 is a fragmentary view in perspective of the sheet metal body of the combustion chamber;

Figure 6 is a horizontal sectional view, taken on the plane VI—VI of Figure 5;

Figure 7 is a vertical sectional view, taken on the plane VII—VII of Figure 6;

Figure 8 is a fragmentary view in perspective of the meeting edges of the corrugated sheets at the top or crest of the combustion chamber, with the angle iron that is used in the union of the sheets ready to be assembled;

Figure 9 is a view in cross section and to larger scale of the completed union;

Figure 10 is a fragmentary view of the united sheets in side elevation; and

Figure 11 is a view corresponding to Figure 10, illustrating a refinement in structural detail.

Figure 1:
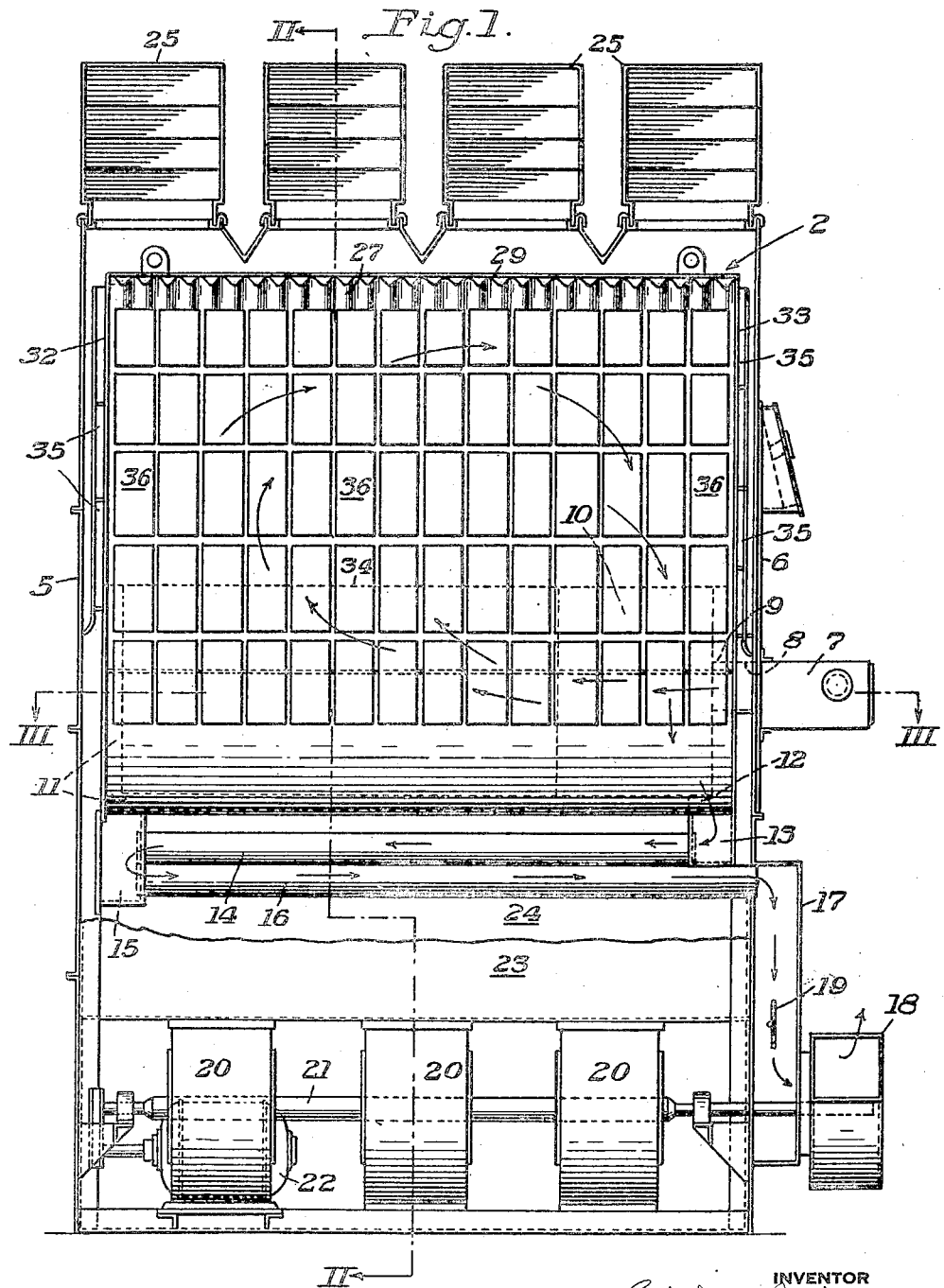
Figure 1 is a view of the heater in side elevation, with the adjacent side wall of the outer casing removed, to reveal details of internal construction.

Referring to the drawings the reference numeral 2 indicates the combustion chamber arranged within and spaced from the side walls 3 and 4 and end walls 5 and 6 of the outer casing or housing. Other than as described herein, the heater may be understood to be constructed in accordance with the teaching of Letters Patent No. 2,376,140. In Figure 1 the side wall 3 (Figure 2) is removed to reveal the combustion chamber and other structure within the casing.

In this case the heater may be understood to be oil fired or gas fired, a suitable burner 7 being arranged to direct through a port 8 in the end wall 6 of the outer casing and a port 9 in the adjacent end wall of the combustion chamber a combustible mixture of fuel and air. The combustion chamber is of trough shape as viewed in vertical section (Figure 2), and the burning column of fuel and air is directed longitudinally into the chamber. As the burning column of fuel and air approaches the end wall of the chamber opposite to the burner end wall, the flames and hot products of combustion sweep upward and flow in reverse direction along the upper walls of the chamber, and then loop downward into passages 10, formed at the firing end of the chamber by tapering the refractory lining 11 inwardly toward the burner. From these passages 10 the hot waste gases flow through an opening 12 in the floor of the combustion chamber into a header 13, whence they stream through an upper bank or pass of heat-exchange tubes 14, a header 15, a lower bank or pass of heat-exchange tubes 16, and a flue-box 17 to an exhaust fan 18, which delivers the waste gases into the open atmosphere, or into a suitable stack (not shown). The flue-box contains a damper 19, by means of which the effect of the fan may be regulated as and if need be.

Within the bottom of the outer casing of the heater structure a fan is provided, in this case three fans 20 are provided, whose impellers are mounted on a common shaft 21 driven by an electric motor 22. The fans draw air from the outer atmosphere into the bottom of the casing, and direct streams of air upward through the banks of heat-exchange tubes 14 and 16. Metal plates 23 and 24, forming a breeching of inverted funnel shape in cross section, confine the streams of air until they pass between and over the hot surfaces of the heat-exchange tubes, it being noted that in Figure 1 the upper part of the plate 23 is shown broken away for purposes of illustration.

Upon emerging upward from the heat-exchange tubes, the streams of air strike the bottom of the combustion chamber 2, and, spreading outward in contact therewith, rise through the vertical passages formed by and between the hot walls of the combustion chamber and the walls 3, 4, 5 and 6 of the outer casing. At the top of the structure the heated air is discharged through louvered cowls 25 into the space or room to be heated.

The side walls and bottom of the lower, trough-shaped body portion of the elongate horizontally extending combustion chamber 2 are formed of plain sheet metal 26, and the side walls of the upper body portion of the chamber are formed of sheets 27 and 28 of corrugated metal, the corrugated sheets being inwardly curved and united in a joint 29 to form the top of the combustion chamber. The lower edges of the corrugated sheets 27 and 28 are united, as at 30 and 31, to the edges of the plain sheet 26 at the two sides of the combustion chamber. The opposite end walls 32 and 33 of the combustion chamber are in this case formed of plain sheet metal, cut in pattern to match the cross sectional contour of the combustion chamber, and to the edges of these end walls the assembly of plain and corrugated sheets is united, as by weldingn. Upon the internal surfaces of the plain sheet metal walls of the lower, trough-shaped body of the combustion chamber the lining 11 of plastic refractory material is molded, dried and solidified. At the burner end of the chamber the refractory lining is inclined away from the side walls of the chamber to the burner port 9 to provide the flue passages 10 that lead the products of combustion downward, on opposite sides of the injected column of fuel and air, and into the header 13. Advantageously, the refractory lining 11 is continued upward, as at 34, a substantial interval above the joints or lines of union 30 and 31 of the plain and corrugated sheets, and it is important to note that hooks or cleats 11a (Figure 2) are welded or otherwise secured to the refractory-lined portions of the corrugated and plain sheet metal walls of the combustion chamber to provide at suitably distributed points over the expanse of such walls an interlock or anchorage of the refractory material to the metal.

The end walls and corrugated side walls of the chamber are equipped with deflector plates 35 and 36, to give turbulence to the streams of air that sweep upward over the hot external surfaces of the chamber, and to insure more intimate contact of the air with the hot surfaces and effect better heat transfer. The provision of such deflectors is dealt with in Letters Patent No. 2,115,057, granted April 26, 1938, to Harold C. Anderson.

Referring to Figures 5 to 7, it will be understood that each joint 30 and 31, by means of which the lower edges of the corrugated sheets 27 and 28 are united to the upper edges of the sheet 26 along the two sides of the combustion chamber, comprises a flange 37 that extends angularly outward from each edge of the sheet 26. The flange 37 extends horizontally along the side of the chamber, and in this case is formed by bending the marginal edge of the sheet 26 outward, although it will be perceived that an angle iron might be welded to the marginal edge of the sheet to provide an equivalent construction. The horizontal flange is at least equal in breadth to the overall thickness of the corrugated sheet, and the lower edge of the corrugated sheet is sheared square, or approximately so, to fit upon the upper face of the flange as shown. Union is effected by welding the edge of the corrugated sheet throughout its serpentine extent to the body of the flange. In such way the corrugated sheets 27 and 28 are effectively united to the plain sheet metal 26.

At the top of the combustion chamber the upper edges of the sheets are cut off square to the general planes of the sheets, or approximately so. A length of rolled metal section, here shown as an angle 38, is positioned in the valley formed between the meeting corrugated edges of the sheets, with the two angular faces of the section (38) abutting against and welded to said edges. The angle of said faces is complementary to the angle of convergence of the sheets, as may be understood upon reference to Figures 8 to 10. After the union of the sheets with the angle 38 has been effected, the portions of the flanges of the angle that extend across the troughs of the corrugations may be cut away, leaving the troughs unobstructed, as shown in Figure 11. This latter refinement may be desired in certain types of heaters.

Turning now to a consideration of the features in which my present invention lie, attention is directed to the arrangement of the plurality (two) of banks or passes of heat-exchange tubes 14 and 16, and of the headers 13 and 15, all arranged externally of the combustion chamber 2 but within the outer casing of the heater, together with the complementary organization of the flue-box 17 and the exhaust fan 18 arranged as a unit on the external wall of the casing. It is important to note that the flue-box 17 provides a header for the delivery end of the secondary bank or pass of heat-exchange tubes 16. The exhaust fan 18 is mounted immediately upon the wall of this combination header and flue-box 17, and is positioned with its impeller in axial alignment with the shaft 21 that carries the impellers of the air fans 20 within the outer casing of the heater. The shaft 21 is continued in a portion of reduced diameter outwardly through the wall of the outer casing and mounts the impeller of the exhaust fan 18. Thus, all of the fans of the heater, the air fans and the waste gas exhaust fan, are driven by a single shaft 21 geared or belted to a single motor 22. Accordingly, the great practical advantages of the unit assembly of the exhaust fan upon the wall of the combined header and flue-box 17 will be appreciated, and such advantages are realized not only in heater structures that have their air-delivering cowls positioned at the top of the heater, but in various other heater structures, say in an inverted heater structure, such as that disclosed in my copending application Serial No. 614,313, filed on even date herewith which has now matured into Patent No. 2,512,384, dated June 20, 1950.

It will be noted that the V-shaped bridge wall that is arranged across the remote end of the combustion chamber to receive impingement of the flames jetted by the burner in the heater of Patent No. 2,376,140 is eliminated in the heater structure herein described. Additionally, the usual explosion and access door 40 is advantageously arranged in the front rather than the back wall of the heater.

The travel of the flames and hot products of combustion first through a double, looped course within the combustion chamber and then through two successive passes of heat-exchange tubes is promotive of the high thermal efficiency of the heater described. More particularly, the burner 7 directs a column of burning fuel and combustion air longitudinally of the refractory trough portion of the combustion chamber, and it is to be here remarked that the refractory trough portion of the combustion chamber may be formed of a heat resistant metal without the need of the plastic refractory lining 11. Upon approaching the remote end of the lower refractory fire-box portion of the combustion chamber, the flames and hot gases loop upward and flow in reverse direction, in intimate contact with the upper heat-conducting walls of the combustion chamber, and, reaching the firing end of the combustion chamber, the flames and gases sweep downward in divided stream into the spaces 10 on opposite sides of the line of delivery of the burner 7. From the spaces 10 the residual flames and the products of combustion enter the header 13 and flow through the upper bank or pass of heat-exchange tubes 14 into the header 15, whence they flow through the lower bank or pass of tubes 16 into the combination header and flue-box 17. This flow or travel of the flames and hot gases is induced by the action of the exhaust fan 18, whose draft effect is subject to accurate regulation by means of the manual setting of the damper 19. Thus, it will be perceived that flames and/or hot waste gases proceed through two generally horizontal courses of flow within the combustion chamber 2 and then flow first in one horizontal direction and then through the opposite horizontal direction through succeeding banks or passes of heat exchange tubes into a flue-box and exhaust fan unit. This cycle of flow of the flames and hot waste gases in the combustion chamber and through the several passes of heat-exchange tubes establishes, in conjunction with the passage of the air first over the external surfaces of the several banks of tubes and then over the external surfaces of the combustion chamber walls, provides a heat transfer efficiency that approaches the practical ideal, it being noted that the flow of air is in a direction extending transversely or vertically of the successive horizontal courses of flow of the flames and hot waste gases.

Air has been described as the fluid to be heated in its passage over the walls of the heat-exchange tubes and the combustion chamber, but other fluids than air are held in contemplation. And within the terms of the appended claims other variations of the invention, as well as various modifications, are permissible within the spirit of the invention.

I claim:

1. A unit heater comprising heat-conducting walls forming a horizontally extending internally fired combustion chamber having an outlet for the escape of products of combustion from points above the bottom of said chamber and adjacent to one end thereof, an outer casing having walls spaced from said heat-conducting walls and forming passageways for air to be heated, a header below said combustion chamber into which said outlet opens, a pass of horizontal heat-exchange tubes communicating at one end with said header, a flue-box communicating with the opposite end of said pass of heat-exchange tubes, an exhaust fan mounted upon the wall of said flue-box with the fan inlet opening through the wall of the flue-box, a burner opening through the combustion chamber wall adjacent to and above said header, said burner being directed to deliver a burning column of fuel and air longitudinally into the lower portion of said chamber and adapted to effect, in conjunction with said exhaust fan, the sweep of the flames and hot products of combustion through a succession of horizontal courses of flow, one of which extends in horizontal direction along the lower portion of said combustion chamber and away from said outlet, another of which extends in horizontal direction along the upper portion of said combustion chamber and then downward through said outlet, and another of which extends below the other courses in horizontal direction through said pass of heat-exchange tubes into said flue-box and exhaust fan, a fan for driving air upwardly through said passageways over the hot external surfaces of said heat-exchange tubes and said combustion chamber, a motor, and means for connecting said exhaust and air fans to said motor.

2. A unit heater comprising heat-conducting walls forming a horizontally extending internally fired combustion chamber having an outlet for the escape of products of combustion from points above the bottom of said chamber and adjacent to one end thereof, an outer casing having walls spaced from said heat-conducting walls and forming passageways for air to be heated, a pass of horizontal heat-exchange tubes communicating at one end with said outlet for products of combustion, a header into which the other end of said pass of tubes open, a second horizontal pass of heat-exchange tubes extending from said header, a flue-box into which the tubes of said second pass open, an exhaust fan connected to said flue-box, a burner opening through the combustion chamber wall adjacent to said outlet, said burner being directed to deliver a burning column of fuel and air longitudinally into the lower portion of said chamber and adapted to effect, in conjunction with said exhaust fan, the sweep of the flames and hot products of combustion through a succession of horizontal courses of flow, one of which extends in horizontal direction along the lower portion of said combustion chamber away from said outlet, another of which extends in horizontal direction along the upper portion of said combustion chamber and then downward through said outlet, and another of which extends below the other courses in horizontal direction through said passes of heat-exchange tubes into said flue-box and exhaust fan, a fan for driving air through said passageway over the hot external surfaces of said heat-exchange tubes and said combustion chamber, a motor, and means for connecting said exhaust and air fans to said motor.

3. A unit heater comprising heat-conducting walls forming a horizontally extending externally fired combustion chamber, an outer casing having walls spaced from said heat-conducting walls and forming passageways for air to be heated, a header and an outlet leading thereinto from points above the bottom of said combustion chamber at one end thereof, a pass of horizontal heat-exchange tubes extending from said header, a second header receiving the ends of said tubes extending from the first header, a second pass of horizontal heat-exchange tubes extending from said second header, a flue-box into which the tubes of said second pass open, an exhaust fan mounted upon the wall of said flue-box, with the fan inlet opening through the wall of the flue-box, a burner opening through the end wall of the combustion chamber above said first header, said burner being directed to deliver a burning column of fuel and air longitudinally into the lower portion of said chamber and to effect, in conjunction with said exhaust fan, the sweep of the flames and hot products of combustion through a succession of horizontal courses of flow, one of which extends in horizontal direction along the lower portion of said combustion chamber and away from said outlet leading into said first header, another of which extends in horizontal direction along the upper portion of said combustion chamber and then downward through said outlet into said first header, and another of which extends below the other courses in horizontal direction through said passes of heat-exchange tubes into said flue-box and exhaust fan, a fan for driving air through said passageway over the hot external surfaces of said heat-exchange tubes and said combustion chamber, a motor, and means for connecting said exhaust and air fans to said motor.

4. A unit heater comprising heat-conducting walls forming a horizontally extending internally fired combustion chamber, an outer casing having walls spaced from said heat-conducting walls and forming passageways for air to be heated, a burner opening through the wall of said chamber at one end thereof, said burner being directed for delivering a burning column of fuel and air longitudinally into the lower portion of said combustion chamber, a primary header below said combustion chamber, the wall of said combustion chamber at the burner end thereof including an outlet passage leading from points above the floor of said chamber into said primary header at points on opposite sides of and adjacent to the line of delivery of said burner, a primary pass of horizontal heat-exchange tubes extending from said primary header, a secondary header into which the tubes of said primary pass open, a secondary pass of horizontal heat-exchange tubes extending from said secondary header, a flue-box into which the tubes of said secondary pass open, an exhaust fan having its inlet communicating with said flue-box, and means for driving said fan to effect, in conjunction with said burner, a looped course of travel of the flames and products of combustion in said combustion chamber and then a divided flow of such flames and products into said outlet passage and thence through said primary header, primary pass of tubes, secondary header and tubes into said flue-box and fan.

5. A unit fired heater comprising an internally fired horizontally extending combustion chamber having heat-conducting walls arranged within and spaced from an outer casing and providing between the chamber and the casing walls a passageway for air to be heated, air-delivering outlets opening from said casing above said combustion chamber, a burner mounted at one end of said combustion chamber to direct a burning column of fuel and air into the lower portion of such chamber, a flue-box, two headers arranged immediately below said combustion chamber, one of said headers being located below said burner and communicating with the interior of said combustion chamber from points above the bottom thereof, and the second header being located adjacent to the end of said combustion chamber opposite to that to which said burner delivers, two passes of heat-exchange tubes arranged immediately below said combustion chamber, one of said passes of heat-exchange tubes extending from the header which communicates with the interior of said combustion chamber to the second header, and the other pass of heat-exchange tubes extending from said second header to said flue-box, an exhaust fan for drawing the products of combustion from said combustion chamber through said headers and heat-exchange tubes and flue-box, and a fan for driving air upwardly through said passageways over the external surfaces of said tubes and combustion chamber and through said air-delivering outlets.

RALPH M. RUSH.

REFERENCES CITED

The following references are of record in the file of this patent:

UNITED STATES PATENTS

| Number | Name | Date |
|---|---|---|
| 96,328 | Lee | Nov. 2, 1869 |
| 1,440,465 | Hugoniot | Jan. 2, 1923 |
| 1,644,180 | Croan | Oct. 4, 1927 |
| 1,707,531 | Miles | Apr. 2, 1929 |
| 1,737,732 | Sauvage | Dec. 3, 1929 |
| 2,021,605 | MacRae | Nov. 19, 1935 |
| 2,136,235 | Crago | Nov. 8, 1938 |
| 2,376,140 | Henderson | May 15, 1945 |

FOREIGN PATENTS

| Number | Country | Date |
|---|---|---|
| 730,002 | France | May 3, 1932 |